United States Patent

Gerkin et al.

[11] Patent Number: 5,525,640
[45] Date of Patent: Jun. 11, 1996

[54] SILICONE SURFACTANTS FOR USE IN INERT GAS BLOWN POLYURETHANE FOAMS

[75] Inventors: Richard M. Gerkin; Mark E. Harakal; Lee F. Lawler; Glenn A. Miller, all of Kanawha, W. Va.

[73] Assignee: OSi Specialties, Inc., Danbury, Conn.

[21] Appl. No.: 527,801

[22] Filed: Sep. 13, 1995

[51] Int. Cl.$^6$ .................................................. C08G 18/61
[52] U.S. Cl. ........................ 521/112; 521/155; 528/25; 528/27; 528/29
[58] Field of Search ..................... 521/112; 528/25, 528/27, 29

[56] References Cited

U.S. PATENT DOCUMENTS

| | | |
|---|---|---|
| 3,184,419 | 5/1965 | Merriman . |
| 3,706,681 | 12/1972 | Bachura . |
| 3,836,560 | 9/1974 | Prokai et al. . |
| 3,849,156 | 11/1974 | Marlin et al. . |
| 3,947,386 | 3/1976 | Prokai et al. . |
| 3,957,842 | 5/1976 | Prokai et al. . |
| 4,022,722 | 5/1977 | Prokai et al. . |
| 4,022,941 | 5/1977 | Prokai et al. . |
| 4,136,239 | 1/1979 | Rossmy ................................. 521/112 |
| 4,276,385 | 6/1981 | Tenhagen ............................. 521/112 |
| 4,304,872 | 12/1981 | Tenhagen ............................. 521/112 |
| 4,483,894 | 11/1984 | Porter et al. . |
| 4,814,409 | 3/1989 | Blevins, II et al. . |
| 4,913,958 | 4/1990 | Skaggs et al. . |
| 5,093,376 | 3/1992 | Möhring et al. ..................... 521/112 |
| 5,120,770 | 6/1992 | Doyle et al. . |
| 5,145,879 | 9/1992 | Budnik et al. . |
| 5,306,737 | 4/1994 | Burkhart et al. . |

FOREIGN PATENT DOCUMENTS 0645226 3/1995 European Pat. Off. .

*Primary Examiner*—Morton Foelak
*Attorney, Agent, or Firm*—Andrew S. Reiskind

[57] ABSTRACT

It has now been found that the use of inert gases as an auxiliary blowing agent in flexible polyurethane foams places unexpected requirements on the composition of the silicone surfactants used in such foams. Typical silicone polyalkylene oxide polyether copolymer comb-type surfactants containing greater than about 37% ethylene oxide in the pendant polyether chains cause large cells when added inert gas is used as the blowing agent.

23 Claims, No Drawings

SILICONE SURFACTANTS FOR USE IN INERT GAS BLOWN POLYURETHANE FOAMS

BACKGROUND OF THE INVENTION

Historically, numerous grades of polyurethane foams were blown with chlorofluorocarbon (CFC) based blowing agents to reduce foam density, control foam firmness and to cool the foams to minimize discoloration, degradation and possible foam ignition problems. World-wide issues regarding ozone depletion in connection with certain CFCs has led to the Montreal Protocol, which phases out the production of CFCs.

Thus, the polyurethane foam industry has tried to achieve the same foam grades and quality produced using alternate blowing agents (ABAs). Many different ABAs have been evaluated including HCFC-141b, HFC-134a, HFC-22, alkyl carbonates and pentane. In flexible slabstock foams in particular, other approaches have been taken, including the use of acetone, methylene chloride, carbon tetrachloride, trichloroethane, and pentane as ABAs. While functional, these approaches also have problems including flammability (for acetone and pentane) and toxicity (for the chlorocarbons).

More recently, a technology has been developed which entails the use of supplemental added inert gases, e.g., $CO_2$, as part of the blowing agent for flexible polyurethane foams, which is described in European Patent Publication No. 0 645 226 A2 (hereinafter "Dissolved Gas Technology"). Auxiliary gas is added to the system as a blowing agent and is used in conjunction with the $CO_2$ generated from the reaction of isocyanate with water. However, this prior art focuses on the details of a process for frothing a slabstock foam reaction mixture using liquid $CO_2$ with special equipment and does not teach what type of silicone surfactant should be used therein.

The prior art does teach a myriad of silicone surfactants for use in polyurethane foams, but none are directed to Dissolved Gas Technology, see U.S. Pat. Nos. 5,145,879 and 4,814,409. The standard structures do not provide teachings as to which surfactants would work and many of these surfactants do not work in stabilizing the foam or providing uniform cell size.

SUMMARY OF THE INVENTION

Previously, it was anticipated that all silicone surfactants currently used in the preparation of conventional slabstock foams would function well in stabilizing the froth (i.e., would give low froth densities and uniform cell structure) in an all inert gas blown foam. What has been discovered herein is that only certain classes of silicone surfactants are efficient at capturing and holding gas whipped in the foam formulation, a necessity for such foams. Surprisingly, it was discovered that comb-type silicone copolymers having a total ethylene oxide (EO) content of less than about 37% by weight of the copolymer unit in the silicone consistently gave lower froth densities in a froth test, and better quality urethane foams than other silicone copolymers with higher EO content. This was particularly unexpected since the higher EO content silicone copolymers function extremely well in most varieties of conventionally blown (i.e., no added inert gas) urethane foams that are produced in the commercial flexible foam market, and it was believed that they would do well in the all inert gas blown foam.

DESCRIPTION OF THE INVENTION

Surfactant Structure

The silicone surfactants of the present invention have dimethyl siloxane backbones with attached polyalkylene oxide polyether pendant groups, i.e., "comb" copolymers. The Si—C bonds in these copolymers are hydrolytically stable, and many of these surfactants can be used in water amine premixes. They may be designed with flame-retardant characteristics for use in flame retardant foam compositions. The surfactants of this invention are silicone/polyether compositions having the following generalized average formula R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[Si(CH$_3$)R$^4$O—]$_d$—Si(CH$_3$)$_2$—R, or

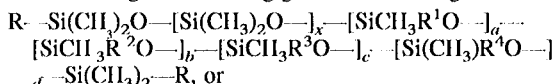
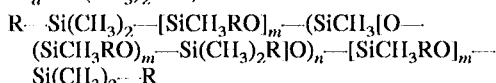

where: $R^1$, $R^2$ and $R^3$=polyalkylene oxide polyethers of the formula —B—C$_n$H$_{2n}$O—(C$_2$H$_4$O)$_e$—(C$_3$H$_6$O)$_f$(C$_4$H$_8$O)$_g$Z, where $R^1$ has a blend average molecular weight ("BAMW") in the range 3000 to 6000 gms/mole and EO is 20–60 weight percent of the alkylene oxide content of the polyether; $R^2$ has a BAMW in the range 800 to 2900 and EO is 20–60 weight percent of the alkylene oxide content of the polyether; $R^3$ has a BAMW in the range 130 to 800 gms/mole and EO is 5 to 100% by weight of the alkylene oxide content of the polyether; $R^4$ is an alkyl or aryl group of $C_1$ to $C_{12}$, B is derived from a moiety capable of undergoing hydrosilation, R is selected from $R^1$, $R^2$, $R^3$ or $R^4$; x=40–200; a+b+c+d=y, where b or c (but not both) may be 0, d/(a+b+c)=0 to 1, a+b>0, y=5 to 40; m=10 to 100; n<4; Z=represents —H, an alkyl or aralkyl group of 1–8 carbon atoms, —C(O)Z', —C(O)OZ" or —C(O)NHZ'; Z' represents monofunctional alkyl or aryl groups of 1 to 8 carbon atoms; e, f and g are defined by the molecular weight required by the polyether; with the proviso that the total EO content of the surfactant structure is less than 37% by weight.

$R^1$ are preferably approximately 35–55% by weight of EO and most preferably 40% EO. It is preferred that such moieties have BAMW greater than 3500 and especially preferably greater than 4000 daltons. $R^2$ are preferably approximately 35–55% by weight of EO and most preferably 40% EO. It is preferred that such moieties have BAMW of approximately 1100–2300 and most preferably 1400–1600 daltons. $R^3$ preferably contain little (23 20 w/w %) or no propylene oxide residues and have BAMW in the range 300–750 daltons.

There may also be more than one different polyether from each group. For example, a copolymer may be composed of (a) two $R^1$-type polyethers differing in molecular weight and/or EO-content (e.g., 55% EO-4000 MW and 44% EO-5500 MW) and (b) an $R^2$-type polyether. In addition, butylene oxide may be substituted for propylene oxide in the polyether backbone. The polyether moieties can be linear or branched and can contain any number of carbon atoms.

The alkyl pendant groups ($R^4$) can be alkyl groups (1 to 12 carbon atoms), substituted alkyl groups (1 to 12 carbon atoms), aryl or alkaryl groups. Z is preferably —C(O)CH$_3$ or CH$_3$. B is preferably an allyl derivative, e.g., propyl or a methallyl derivative, e.g., isobutyl.

Preparation of this type of copolymer is discussed in U.S. Pat. Nos. 4,814,409 and 5,145,879, which are incorporated herein by reference.

Polyurethane Foam

The surfactant is to be used in a foam which is blown in accordance with Dissolved Gas Technology. The foam usually is comprised of (a) a polyether polyol containing an average of more than two hydroxyl groups per molecule; (b) an organic poly isocyanate: (c) at least one catalyst for production of polyurethane foam; (d) water; (e) a surfactant as defined above; (f) an inert gas. All of these material are well known in the art, described in U.S. Pat. Nos. 4,814,409 and 4.855,329, which are incorporated herein by reference.

The polyols have an average number of hydroxyl groups per molecule of at least slightly above 2 and typically 2.1 to 3.5. The organic polyisocyanates contain at least two isocyanate groups, e.g., toluene diisocyanates (TDI), and the index of the foam is typically 60 to 130. The catalyst is usually an amine such as triethylene diamine and/or bis(2-dimethylaminoethyl) ether, and certain metal catalysts, including organic derivatives of tin, particularly tin compounds of octanoic acid or lauric acid. Other additives may be added to the polyurethane foam to impart specific properties to the foam, including, but not limited to, coloring agents, flame retardants, and GEOLITE® Modifier foam additives (available from OSi Specialties, Inc. of Danbury, Conn.). The inert gas is one which is soluble in the foam formulation at elevated pressures, but will come out of solution (i.e., blow) at atmospheric pressure. An exemplary such gas is $CO_2$, but nitrogen, air or other common gases, including hydrocarbon gases, such as methane and ethane may also be used.

The surfactants should be of the type mentioned above and should be present at 0.05 to 5 wt. percent of the total reaction mixture, preferably 0.2 to 1.5 wt. percent.

The foam is manufactured by mixing the ingredients together and putting them under high pressure (i.e., at least greater than atmospheric pressures) so that the inert gas is dissolved in the foaming mixture. Then the mixture is flashed, by releasing the pressure which causes the gas to form bubbles at nucleation sites in the foaming system and thus act as a blowing agent. This produces a reduced density foam. For a more complete description of the process and the equipment required therein, see European Patent Publication No. 0 645 226 A2, which is incorporated herein by reference.

The foam cell structure is uniform, whereas all prior surfactants with the higher EO content produced non-uniform cell structure. Additionally, the foam cell size is consistently smaller (cells per cm) in these foams, i.e., greater than 7 cells per centimeter, than in foams prepared with the higher EO surfactants.

Use

The polyurethanes produced in accordance with the present invention can be used in the same fields as conventional polyether polyurethanes. For example, the foams of the present invention can be used with advantage in the manufacture of textile interliners, cushions, mattresses, padding, carpet underlay, packaging, gaskets, sealers, thermal insulators and the like.

EXAMPLES

Examples 1–5

Several surfactants were tested to determine if they would be acceptable in all $CO_2$ blown polyurethane foam. A predictive test method developed as part of the present invention was one in which air was mechanically whipped with a conventional polyether polyol and the density of the resultant froth determined. Comparisons could then be made between various surfactants based on their ability to produce a low density polyol froth. From this data, correlations could then be made with the performance of these surfactants in polyurethane foams made using Dissolved Gas Technology.

The procedure followed was as follows: A 6 oz styrofoam cup (Dart #6J6) was placed on a balance and tared to "zero". The cup was filled to the top (line of sight) with the polyol to be frothed and the weight was recorded. The polyol and surfactant being evaluated were added to the bowl and whipped for five minutes at maximum speed setting in a KITCHENAID Mixer, Model number KSM90, equipped with a number K45 stainless steel mixing bowl and a stainless steel wire whisk beater. Then a new cup was placed on the balance, tared to zero and fresh froth was poured into the cup, filling it to the same level as before with the weight of the frothed mixture being recorded. The froth density was calculated as the weight of frothed mixture divided by weight of unfrothed mixture.

The surfactants used, where M is $(CH_3)_3SiO_{1/2}$—, D is —$O_{1/2}Si(CH_3)_2O_{1/2}$—, D" is —$O_{1/2}Si(CH_3)R'O_{1/2}$— and R' is $R^1$, $R^2$, or $R^3$, were as follows:

Surfactant #1=$MD_xD"_yM$, where R' is composed of two different acetoxy capped polyethers at a BAMW in gms/mole of 1250, and the total EO content is 38% by weight.

Surfactant #2 =$MD_xD"_yM$, where R' is composed of three different acetoxy capped polyethers. Polyether a and polyether b are blended together to an average mw of 2100. This blend is then combined with polyether c at a ratio of [polyether a+polyether b]/polyether c of 1.6. The total EO content is 30% by weight.

Surfactant #3=$MD_xD"_yM$, where R' is composed of two different methyl capped polyethers at a blend average molecular weight of 2100, and the total EO content is 22% by weight.

Surfactant #4=$MD_xD"_yM$, where R' is composed of three different methyl capped polyethers. Polyether a and polyether b are blended to an average molecular weight of 3100. This blend is then combined with polyether c at a ratio of [polyether a+polyether b]/polyether c of 1.05. The total EO content is 32%.

The results are set out below in Table 1

TABLE 1

Effect of Ethylene Oxide Content in the Surfactant on Polyol Froth Density

| Example | Surfactant | % EO Tot | Polyol 1 Froth Density 1 phr* | 2 phr* |
| --- | --- | --- | --- | --- |
| 1 | None | — | 0.95 | — |
| 2 | Surf #1 | 38 | 0.75 | 0.7 |
| 3 | Surf #2 | 30 | 0.46 | 0.37 |
| 4 | Surf #3 | 22 | 0.53 | 0.41 |
| 5 | Surf #4 | 32 | 0.56 | 0.43 |

*phr = parts of polyol vs. rest of formulation.

As indicated, there is a striking contrast between the ability of a surfactant with 22 to 32% EO versus one of 38% EO to hold in the air and thus, produce a good froth.

Examples 6–9

$CO_2$ blown foam production line trials

These experiments were run on foam lines equipped with systems capable of utilizing $CO_2$ as an auxiliary blowing agent. The system utilized was similar to the one described in European Patent Application 0 645 226 A2. The foams studied were conventional formulations set forth in Table 2 below.

Cell count per centimeter and overall cell uniformity were used to distinguish the performance difference (see Table 2). Generally speaking, more cells per centimeter (>about 7), and a high degree of uniformity (ranking of less than or equal to about 3) is desirable. The IFD measured is the Indentation Force Deflection. IFD 25% is the force required to indent a foam specimen of suitable size with a 50 in² indenter foot to a depth of 25% of its initial height and the IFD 65% is the force required to indent the same foam to a depth of 65% of its initial height both measured according to ASTM-3574. In these cases a lower IFD is desirable. For each sample the cell size (commonly referred to as the foam "structure") was assessed and breathability through the foam was determined using a Nopco breathability apparatus (adjusted back pressure to 0.5 inches of water and read air flow in standard cubic feet per minute). Ball Rebound is a measurement of a foams resiliency. Ball Rebound is the percent of original drop height that a steel ball rebounds from the foams surface. For example, if a steel ball, dropped from 10 inches above a foam's surface, rebounds to 6 inches above the surface, the Ball Rebound is 60%. Compression Set is a measure of a foam's ability to recover from compression deformation. A Compression Set of 10% means that a foam recovers to 90% of it original height when a 1 inch specimen is compressed to 0.1 inch and stored at elevated temperature for a specified time period. Measurements are made ½ hour after removing the deforming force. Exact procedure may be found in ASTM-3574.

The chemicals used in the experiment were as follows:

Polyol 1=ARCOL polyol 16–56, supplied by Arco Chemical Co.

Polyol 2=3500 mw EO/PO triol containing 10% internal EO

Catalyst 1=stannous octoate;

Catalyst 2=an amine catalyst sold by OSi Specialties as NIAX catalyst A-1;

Catalyst 3=an amine catalyst sold by OSi Specialties as NIAX catalyst A-33; and

MD-145=a cross-linker commercially available from Shell.

TABLE 2

| Formulation: | |
| --- | --- |
| Component | Amount (parts) |
| Polyol 2 | 95 |
| MD-145 | 5 |
| water | 4.8 |
| $CO_2$ | 3 |
| Catalyst 2 | 0.087 |
| Catalyst 3 | 0.173 |
| Catalyst 1 | Varied |
| Silicone Surfactant | Varied |
| Toluene diisocyanate | 110 (Index) |

TABLE 3

| | Foam Results: | | | |
| --- | --- | --- | --- | --- |
| Example | 6 | 7 | 8 | 9 |
| Silicone Surfactant # | 2 | 3 | 4 | 1 |
| Amount, phr | 1.2 | 1.4 | 1.5 | 1.4 |
| Catalyst 1, phr | 0.14 | 0.14 | 0.15 | 0.14 |

TABLE 3-continued

| | Foam Results: | | | |
| --- | --- | --- | --- | --- |
| Example | 6 | 7 | 8 | 9 |
| Foam Properties | | | | |
| Density, kg/m3 | 16.3 | 16.7 | 16.1 | 16.3 |
| IFD, 25%, N | 147 | 128 | 144 | 131 |
| IFD, 65%, N | 304 | 270 | 304 | 300 |
| Nopco, cfm | 3.1 | 4 | 4.4 | 3.8 |
| Ball Rebound, % | 35 | 36 | 42 | 40 |
| 90% Compression Sets., % | 7.4 | 9.4 | 5.9 | 7.7 |
| Cells/cm | 12 | 16 | 11 | 6 |
| Uniformity* | 3 | 2 | 3 | 5 |

*Rating of 1 = all cells the same size and Rating of 5 = broad distribution of cell sizes A total of four different surfactants are shown in Table 3. They represent a series of products in which the EO content ranges from 22 to 38%. All three of the surfactants with EO content <38% gave low polyol froth densities (<0.6 @1 phr use level, Ex. 3, 4 and 5) and produced good to excellent foams in the $CO_2$ blown production experiments (Ex. 6, 7 and 8). The surfactant containing >37% EO (Surf #1) produced the poorest quality foam, i.e., the resultant foams contained many coarse cells and pinholes. The foam quality was so poor that the trial was considered a failure. The utilization of the different silicone surfactants with EO contents between 22 and 32% dramatically improved the cell quality of the foam. Thus, there is the unexpected result that silicone surfactants for use with $CO_2$ as the auxiliary blowing agent in the preparation of flexible slabstock foams require low EO contents.

We claim:

1. A method for stabilizing polyurethane foam characterized by (a) blowing the polyurethane foam with a pressurized inert gas; and (b) adding into the foam formulation a polyalkylene comb oxide polyether polysiloxane copolymer surfactant having an alkylene oxide content of less than about 37 weight percent ethylene oxide.

2. A method according to claim 1 wherein the surfactant has a structure selected from the following generalized structures:

(a) R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[Si(CH$_3$)R$^4$O—]$_d$—Si(CH$_3$)$_2$)$_2$—R; or (b) R—Si(CH$_3$)$_2$O—[SiCH$_3$RO]$_m$—(SiCH$_3$[O—(SiCH$_3$RO)$_m$—Si(CH$_3$)$_2$ R]O)$_n$—[SiCH$_3$RO]$_m$—Si(CH$_3$)$_2$—R;

where: R$^1$, R$^2$ and R$^3$ are polyalkylene oxide polyethers of the formula —B—C$_n$H$_{2n}$O—(C$_2$H$_4$O)$_e$—(C$_3$H$_6$O)$_f$(C$_4$H$_8$O)$_g$Z, where R$^1$ has an average molecular weight in the range 3000 to 6000 gms/mole and ethylene oxide (EO) is 20–60 weight percent of the alkylene oxide content of the polyether; R$^2$ has an average molecular weight in the range 800 to 2900 and EO is 20–60 weight percent of the alkylene oxide content of the polyether; R$^3$ has an average molecular weight in the range 130 to 800 gms/mole and EO is 5 to 100% by weight of the alkylene oxide content of the polyether; R$^4$ is an alkyl or aryl group of C$_1$ to C$_{12}$, B is derived from a moiety capable of undergoing hydrosilation, R is selected from R$^1$, R$^2$, R$^3$ or R$^4$; x=40–200; a+b+c+d=y, where b or c (but not both) may be 0, d/(a+b+c)=0 to 1, a+b>0, y=5 to 40; m=10 to 100;

$n \leq 4$; Z represents —H, an alkyl or aralkyl group of 1–8 carbon atoms, —C(O)Z', —C(O)OZ" or —C(O)NHZ'; Z' represents mono-functional alkyl or aryl groups of 1 to 8 carbon atoms; e, f and g are defined by the molecular weight required by the polyether; with the proviso that the total EO content of the surfactant structure is less than 37% by weight.

3. A method according to claim 2 wherein $R^1$ are approximately 35–55% by weight of EO.

4. A method according to claim 3 wherein $R^1$ have average molecular weights of greater than 3500 daltons.

5. A method according to claim 2 wherein $R^2$ are approximately 35–55% by weight of EO.

6. A method according to claim 5 wherein $R^2$ have average molecular weights of approximately 1100–2300 daltons.

7. A method according to claim 2 wherein $R^3 \leq 20$ w/w % propylene oxide residues.

8. A method according to claim 7 wherein $R^3$ have average molecular weights in the range 300–750 daltons.

9. A method according to claim 2 wherein $R^4$ is an alkyl group of 1 to 12 carbon atoms, substituted alkyl groups of 1 to 12 carbon atoms, aryl or alkaryl group.

10. A method according to claim 2 wherein Z is —C(O)CH$_3$ or CH$_3$.

11. A method according to claim 2 wherein B is an allyl derivative or methallyl derivative.

12. A method according to claim 2 wherein the polysiloxane is selected from group (a).

13. A method according to claim 2 wherein the polysiloxane is selected from group (b).

14. A method according to claim 1 wherein the foam is blown with carbon dioxide.

15. A method of using a surfactant comprising a polyalkyleneoxide polyether polysiloxane comb copolymer having less than 37% by weight of ethylene oxide added to a polyurethane foam formulation which is to be blown with an a pressurized inert gas.

16. A method according to claim 15 wherein the surfactant has a structure selected from the following generalized structures:

(a) R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[Si(CH$_3$)R$^4$O—]$_d$—Si(CH$_3$)$_2$—R; or (b) R—Si(CH$_3$)$_2$O—[SiCH$_3$RO]$_m$—(SiCH$_3$[O—(SiCH$_3$RO)$_m$—Si(CH$_3$)$_2$R]O)$_n$—[SiCH$_3$RO]$_m$—Si(CH$_3$)$_2$—R;

where: $R^1$, $R^2$ and $R^3$ are polyalkylene oxide polyethers of the formula —B—C$_n$H$_{2n}$O—(C$_2$H$_4$O)$_e$—(C$_3$H$_6$O)$_f$(C$_4$H$_8$O)$_g$Z, where $R^1$ has an average molecular weight in the range 3000 to 6000 gms/mole and ethylene oxide (EO) is 20–60 weight percent of the alkylene oxide content of the polyether; $R^2$ has an average molecular weight in the range 800 to 2900 and EO is 20–60 weight percent of the alkylene oxide content of the polyether; $R^3$ has an average molecular weight in the range 130 to 800 gms/mole and EO is 5 to 100% by weight of the alkylene oxide content of the polyether; $R^4$ is an alkyl or aryl group of C$_1$ to C$_{12}$, B is derived from a moiety capable of undergoing hydrosilation, R is selected from $R^1$,$R^2$,$R^3$ or $R^4$; x=40–200; a+b+c+d=y, where b or c (but not both) may be 0, d/(a+b+c)=0 to 1, a+b>0, y=5 to 40; m=10 to 100; $n \leq 4$; Z represents —H, an alkyl or aralkyl group of 1–8 carbon atoms, —C(O)Z', —C(O)OZ" or —C(O)NHZ'; Z' represents mono-functional alkyl or aryl groups of 1 to 8 carbon atoms; e, f and g are defined by the molecular weight required by the polyether; with the proviso that the total EO content of the surfactant structure is less than 37% by weight.

17. A method according to claim 16 wherein $R^1$ are approximately 35–55% by weight of EO.

18. A method according to claim 17 wherein $R^1$ have average molecular weights of greater than 3500 daltons.

19. A method according to claim 16 wherein $R^2$ are approximately 35–55% by weight of EO.

20. A method according to claim 19 wherein $R^2$ have average molecular weights of approximately 1100–2300 daltons.

21. A method according to claim 16 wherein $R^3 \leq 20$ w/w % propylene oxide residues.

22. A method according to claim 21 wherein $R^3$ have average molecular weights in the range 300–750 daltons.

23. A method according to claim 16 wherein $R^4$ is an alkyl group of 1 to 12 carbon atoms, substituted alkyl groups of 1 to 12 carbon atoms, aryl or alkaryl group.

* * * * *

UNITED STATES PATENT AND TRADEMARK OFFICE
CERTIFICATE OF CORRECTION

PATENT NO.   : 5,525,640
DATED        : June 11, 1996
INVENTOR(S)  : Richard M. Gerkin, et al.

It is certified that error appears in the above-indentified patent and that said Letters Patent is hereby corrected as shown below:

Column 6, line 38, Claim 1: delete "comb"

Column 6, line 38, Claim 1: after "polysiloxane" insert --comb--

Signed and Sealed this

Twenty-second Day of October, 1996

Attest:

BRUCE LEHMAN

*Attesting Officer*    *Commissioner of Patents and Trademarks*